US005358984A

United States Patent [19]
Hayes et al.

[11] Patent Number: 5,358,984
[45] Date of Patent: Oct. 25, 1994

[54] POLYMER POLYOL DISPERSANTS FROM POLYMERS CONTAINING ANHYDRIDE GROUPS

[75] Inventors: John E. Hayes, Wilmington, Del.; Robert G. Gastinger, West Chester, Pa.

[73] Assignee: Arco Chemical Technology, L.P., Greenville, Del.

[21] Appl. No.: 66,607

[22] Filed: May 24, 1993

Related U.S. Application Data

[63] Continuation-in-part of Ser. No. 774,685, Oct. 11, 1991, abandoned.

[51] Int. Cl.$^5$ .............................. C08J 7/14; C08K 5/15
[52] U.S. Cl. ................................... 524/112; 524/284; 524/306; 524/314; 525/63; 525/74; 525/79; 525/82; 526/271; 526/272
[58] Field of Search ............... 524/112, 284, 306, 314; 525/63, 74, 79, 82; 526/271, 272

[56] References Cited

U.S. PATENT DOCUMENTS

| | | | |
|---|---|---|---|
| 3,085,986 | 4/1963 | Muskat | 524/233 |
| 3,660,339 | 5/1972 | Schuh, Jr. | 260/29.7 D |
| 4,002,703 | 1/1977 | Fahrbach et al. | 260/901 |
| 4,029,720 | 6/1977 | Seiler et al. | 260/887 |
| 4,198,488 | 4/1980 | Drake et al. | 521/137 |
| 4,539,340 | 9/1985 | Stamberger | 521/157 |
| 4,721,733 | 1/1988 | Gastinger et al. | 521/157 |
| 5,021,506 | 6/1991 | Gastinger et al. | 525/63 |

FOREIGN PATENT DOCUMENTS 1795353 9/1968 Fed. Rep. of Germany.

OTHER PUBLICATIONS

WPI Abstract 89-049220/07 to Japanese Application JP 1004227.
WPI Abstract 89-049221/07 to Japanese Application JP 1004228.

*Primary Examiner*—John Kight, III
*Assistant Examiner*—Duc Truong
*Attorney, Agent, or Firm*—David L. Mossman; Dennis M. Kozak

[57] ABSTRACT

Dispersants that are the reaction product of polyoxyalkylene polyether polyols with polymers containing anhydride groups are discussed. These dispersants may be used in the production of polymer polyols having high styrene contents and high solids contents. The polymers containing the anhydride groups may be preformed polymers which are then reacted with the polyol, or may be formed in the polyol directly prior to esterification with the polyol to form the dispersants. Maleic anhydride and methacrylic arthydride and derivatives thereof are examples of monomers suitable for the dispersants. Polymer polyols made using these dispersants may be reacted with polyisocyanates to produce polyurethanes.

39 Claims, No Drawings

POLYMER POLYOL DISPERSANTS FROM POLYMERS CONTAINING ANHYDRIDE GROUPS

This is a continuation-in-part of copending application Ser. No. 07/774,685 filed on Oct. 11, 1991, now abandoned.

FIELD OF THE INVENTION

The invention relates to dispersants useful in the synthesis of polymer polyols, and in one aspect, is more particularly related to dispersants prepared from a polyol and at least one polymer containing anhydride groups, followed by esterification.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used in sponges, personal care and hygiene items and as specialty packaging materials.

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a number average molecular weight of about 2,000 to 5,000 and above. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated as SAN monomers), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD—indentation load deflection, and CFD—compression force deflection) may be produced in this manner. It would be desirable if polymer polyols could be prepared which would be stable and have low viscosities. Stability is important to the storage life of the polyols before they are used to make the polyurethane foams. The tendency of polymer polyols to undergo phase separation if they are not stabilized is well known. Dispersants are often used to help keep the polymers in the dispersion. Low viscosities and small particle sizes are also important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. Viscosity and particle size are also typically adversely affected with high styrene contents.

The present invention involves the reaction products of homo- or copolymers containing anhydride groups with polyols. Patents are known which relate to the polymerization of monomers having anhydride groups. For example, U.S. Pat. No. 3,085,986 teaches low pressure molding compositions containing a mixture of a polyhydric alcohol having at least one primary hydroxyl group and a solid, linear low molecular weight copolymer of maleic anhydride and styrene which is cross-linked by the alcohol. U.S. Pat. No. 4,198,488 describes the addition of an anhydride monomer to a polymer polyol composition. The product itself is the final polymer polyol: a dispersion of solid particles, and not a preformed soluble dispersant. Stable, fluid polymer polyols made by the free radical polymerization of a monomer mixture of an $\alpha,\beta$-ethylenically unsaturated dicarboxylic acid anhydride and a copolymerizable monomer in an organic polyol medium of secondary hydroxyl terminated polyol are disclosed in U.S. Pat. No. 4,721,733 to Gastinger and Hayes.

Also of interest is the English abstract to Japanese Application 1004228 relating to dispersants for nonaqueous systems comprising a copolymer of alkyl vinyl ether or alpha olefin, and maleic acid anhydride and a polyether polyol or its derivative having a number average molecular weight of 400 to 50,000. See also the English abstract to Japanese Application 1004227 which discusses dispersants in nonaqueous systems obtained by reacting polyether polyols with copolymers of alkyl vinyl ethers or alpha olefins and maleic anhydride. Both of these latter abstracts note that the dispersant is used for dispersing inorganic or organic pigment particulates in nonaqueous media, e.g. oily paint, oily ink, magnetic tape, etc.

To prepare polymer polyol dispersions with high styrene contents and high solids contents, it is the practice in the art to employ polyols which contain specified and ostensibly critical amounts of induced unsaturation, as shown in U.S. Pat. Nos. 3,823,201; 4,454,255 and 4,690,956, among others. These polyols with induced unsaturation are typically prepared by reacting polyols with an unsaturated monomer such as maleic anhydride or the like. U.S. Pat. No. 4,539,340 also relates to the reaction of polyols with monomeric anhydrides.

Stable, low viscosity polymer polyol compositions comprising a continuous phase, a disperse phase within the continuous phase, and a dispersant for enhancing the stability of the resultant polymer polyol are disclosed according to U.S. Pat. No. 5,021,506. In one embodiment, the dispersant is formed by polymerizing at least one acrylate monomer in a polyether polyol to form a single phase homogeneous liquid intermediate reaction product which is transesterified to form a polyol polyacrylate dispersant.

It is well known in the an that high styrene, high solids content polymer polyols are desirable, but difficult to prepare in stable form. There remains a need for novel dispersants for use in preparing polymer polyols that have relatively high styrene contents, but which also have good stability, small particle sizes, and low viscosity as well.

SUMMARY OF THE INVENTION

Accordingly, it is an object of the present invention to provide a dispersant suitable for use in polymer polyols which enables the dispersions to have high styrene contents and high solids contents.

It is another object of this invention to provide a stable polymer polyol composition having a continuous phase, a disperse phase within the continuous phase, and a dispersant for enhancing the stability of the polymer polyol, where the dispersant employs homopolymers and/or copolymers of anhydride monomers.

According to this invention, there is also provided a method for producing the stable polymer polyols described above, which method involves polymerizing an ethylenically unsaturated monomer or mixture of monomers (which form the disperse phase of vinyl polymer particles) in a blend of a polyoxyalkylene polyether polyol continuous phase and the dispersant. A method of stabilizing polymer polyols of this type is also presented.

Providing polyurethane compositions produced using the above described polymer polyols is also an object of this invention.

In carrying out these and other objects of the invention, there is provided, in one form, a dispersant produced by polymerizing at least one anhydride monomer selected from the group consisting of $C_1$-$C_{20}$ anhydride monomers to form a polymer followed by esterifying from about 1 to about 100 mole percent of the total anhydride groups in the polymer with hydroxyl groups of an polyoxyalkylene polyether polyol to form the dispersant.

DETAILED DESCRIPTION OF THE INVENTION

It has been discovered that a new class of dispersants may be prepared which can be used to prepare high solids, high styrene, styrene/acrylonitrile (SAN) dispersions of polyether polyols. These new dispersants are based on the reaction product of polyols with homo- or copolymers containing anhydride groups.

The dispersants of this invention can be prepared by alterative methods. In one method, the in situ method, a graft-polyol intermediate product is first formed by homo- or co-polymerizing ethylenically unsaturated dicarboxylic anhydride monomers in situ in a polyoxyalkylene polyether polyol followed by an esterification reaction to produce a dispersant. In the other method, the blend method, a homopolymer or copolymer containing anhydride groups is separately prepared and blended with a polyoxyalkylene polyether polyol. The resulting blend is converted into the dispersant by an esterification reaction.

In one embodiment, the dispersant of the present invention uses an ethylenically unsaturated dicarboxylic acid anhydride monomer having a formula from the following group:

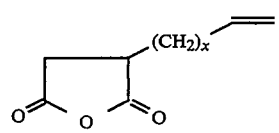

and

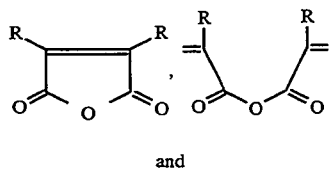

-continued where each R group is independently hydrogen or lower alkyl, where lower alkyl is defined as $C_1$ to $C_4$, where R is preferably methyl if it is an alkyl group. Lower alkyl is defined as a straight or branched alkyl group having from 1 to 6 carbon atoms, preferably 1 to 4. These monomers are sometimes referred to as $C_1$-$C_{20}$ anhydride monomers, as the maximum number of carbons for the monomers is 20. Suitable specific monomers include, but are not limited to maleic anhydride; crotonic anhydride; itaconic anhydride; citraconic anhydride; 2,3-dimethyl maleic anhydride; acrylic anhydride; methacrylic anhydride; propyl succinic anhydride; derivatives thereof; and mixtures thereof. Other monomers may be polymerized with the anhydride containing monomers within the scope of this invention. In one aspect of the invention, maleic anhydride is a preferred anhydride monomer of the invention.

For example, one type of dispersant may be prepared from the reaction of polyols with styrene/maleic anhydride (SMA) resins. Especially preferred are the SMA resins which have been partially esterified because they exhibit high solubility in the polyol. Examples of these resins are SMA 1440, SMA 17352 and SMA 2625 sold commercially by the Sartomer division of Atochem. The reaction is accomplished by simply heating a mixture of the SMA resin, in a proportion ranging from about 2 to 10 wt. %, and the polyol to 180° C. for 1.5 hours to obtain esterification. Alternatively, this type of dispersant has been prepared from the polymerization of styrene and maleic anhydride in situ in a polyol followed by esterification.

Since the anhydride containing polymer may be a homopolymer, it is obvious that 100% of the polymer may be derived from anhydride monomer. At a minimum, in one non-limiting embodiment, at least 1 wt. % of the copolymer should be derived from the anhydride monomer.

There are several advantages of this type of dispersant. It is based on existing, readily available materials, and does not require a special reactor. The procedure is relatively simple and does not require a catalyst and hence removal of such catalyst from a viscous product.

As noted, the unsaturated anhydride may be homopolymerized or copolymerized. While styrene is a preferred comonomer in some instances, other suitable comonomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl a-ethoxyacrylate, methyl a-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, iraconic acid, monomethyl itaconate, t-butylaminoethyl methacrylate, dimethylaminoethyl methacrylate, glycidyl acrylate, allyl alcohol, glycol monoesters of iraconic acid, vinyl pyridine, maleic anhydride, maleimide, N-substituted maleimides, such as N-phenylmaleimide and the like.

The polyol may be a polyoxyalkylene polyether polyol have a number average molecular weight of from about 500 to 15,000, preferably from about 2000 to 10,000. These polyols are typically made by the reaction of an initiator or starting material having a plurality of reactive hydrogens thereon with one or more alkylene oxides. Ethylene oxide, propylene oxide, butylene oxide and mixtures of these may be used. Often, a mixture of ethylene oxide and propylene oxide is preferred. The resulting polyols should have predominantly primary hydroxyl groups. While secondary hydroxyl groups are permissible, as secondary hydroxyl groups tend to predominate, the need for a catalyst to promote the reaction increases, and this is undesirable as described earlier. Additionally, the resultant polyols do not contain any induced unsaturation, and should not be compared with such materials. The reaction of the polyol with the anhydride polymer results in a product with no resultant unsaturation.

Suitable starting materials or initiators for the polyol include, but are not limited to, di, tri- or tetra-hydric initiators, such as glycerin, alkanolamines, alkylamines, aryl or aromatic amines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The first or second polyol may be made by alkoxylating the initiator with a desired number of moles of an alkylene oxide. Preferably, the alkylene oxide has two to four carbon atoms, and is thus ethylene oxide, propylene oxide, butylene oxide or mixtures of these oxides. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein.

As noted, the preparation of the dispersants is quite versatile. In the in situ method described above, the anhydride graft-polymer intermediate can be prepared by polymerizing any suitable anhydride monomer or monomer mixture. Suitable anhydride monomers are described above. The anhydride monomer or monomer mixture is then polymerized in situ in a suitable polyol, such as those described above. Accordingly the anhydride monomer and polymer must be soluble in the polyol. A solvent may be used to dissolve the monomer and polymer.

In one embodiment of this invention, the polyanhydride graft-polyol intermediate will be formed by polymerizing from about 5 to about 90 total weight percent, preferably from about 20 to about 50 total weight percent, of at least one anhydride monomer in a polyoxyalkylene polyether polyol at a reaction temperature within the range of from about 60° to about 150° C. The polymerization process may be batch, semi-batch or continuous. Suitable initiators and concentrations are the same as those described later for polymer polyols. The resulting intermediate product formed a single phase, homogeneous liquid, which then must undergo an esterification reaction to form the dispersant of this invention.

In another embodiment pertaining to the blend method for forming a polyol polyanhydride-derived dispersant, an anhydride homopolymer or copolymer can be used. Particularly suitable for use are the homopolymers and copolymers of the anhydride monomers listed above as being suitable for use in the in situ method for forming the dispersant. The anhydride homopolymer or copolymer is then blended with one or more polyoxyalkylene polyether polyols as described above to give a blended intermediate product which upon esterification gives a polyol polyanhydride-derived dispersant of this invention. The blended intermediate product will be formed to contain from about 1 to about 50 weight percent anhydride polymer, preferably from about 1 to about 20, with the balance being polyol.

The formation of the dispersant from either intermediate product requires a further esterification reaction, typically, but not necessarily, carried out in additional polyoxyalkylene polyether polyol in the absence of a catalyst. The polyol, if added, may be the same as or different than the polyol used to form the intermediate. After esterification, the weight percent anhydride polymer in the dispersant should be from about 0.5 to about 30, preferably from about 1 to about 10. Accordingly, depending upon the weight percent anhydride polymer in the intermediate, it may or may not be desirable to use additional polyol in the esterification reaction. The weight percent anhydride polymer in the dispersant is selected from a number of factors such as the molecular weight and functionality of the polyol and the mole fraction of anhydride groups in the polymer. In general, higher molecular weight and higher functionality polyols require a lower level of anhydride polymer level. Too high a level may cause the mixture to gel because of excess crosslinking and should be avoided. The viscosity of the dispersant is preferably less than 30,000 cps at 25° C. The esterification reaction occurs between the terminal hydroxyl groups of the polyol and the anhydride groups of the anhydride polymer. From about 1 to about 100 mole percent, preferably all of the total anhydride groups of the anhydride polymer react with the hydroxyl groups of the polyol.

The esterification reaction is accomplished by allowing the polyol and anhydride polymer to react at a temperature of from about 150° to 190° C. for about 1.5 to 3 hours. The times and temperatures specified above are exemplary but not required. Catalysts may be added to accelerate the reaction permitting use of lower temperatures and shorter reaction times. Suitable catalysts are well known in the art. The esterification reaction produces a material which contains a significant amount of high molecular weight adducts. The esterification reaction also produces small amounts of carboxylic acid groups. Generally the small amount of acidity present in the dispersant and the low dispersant level present in the polymer polyol does not affect urethane catalysis. If required, the residual acidity may be neutralized by any common technique. For example, additional alkylene oxide could be added.

The polymer polyols of this invention will be formed by polymerizing an ethylenically unsaturated monomer or mixture of monomers in a polyol mixture comprising at least one polyoxyalkylene polyol and the dispersant in the presence of a free radical initiator at a temperature from about 60° C. to about 150° C.

Any conventional process for preparing polymer polyols can be employed including batch, semi-batch, and continuous processes. The preferred process is a semi-batch process in which all or at least a major amount of the dispersant is added in the reactor charge and the major amount of polyol is added in the feed charge. It is most preferred to add all of the dispersant in the reactor charge. If a plurality of continuous stirred tank reactors (CSTRs) in series is employed, the charge to the first CSTR preferably includes all or at least the major amount of dispersant. To the second CSTR, in addition to the product feed from the first CSTR, will be added the feed charge containing the major amount of polyol.

The amount of the dispersant employed to produce the polymer polyol will be within the weight percent range of from about 0.1 to about 30, preferably from about 1 to about 15 based on the total amount of monomer, polyol and dispersant employed. The weight ratio of total monomer or monomer mixture (or disperse phase) to polyol (or continuous phase) will be from about 1:19 to about 1:1.

The preferred ethylenically unsaturated monomers employed to produce polymer polyols of the present invention are both styrene and acrylonitrile to make a copolymer. The copolymer will contain in weight percent 20 to 100 styrene with the balance being acrylonitrile. Other suitable monomers include, but, are not limited to, butadiene; isoprene; 1,4-pentadiene; 1,6-hexadiene, 1,7-octadiene; acrylonitrile; methacrylonitrile; α-methyl styrene; methylstyrene; 2,4-dimethylstyrene; ethyl styrene; isopropylstyrene; butylstyrene; substituted styrenes such as cyanostyrene; phenylstyrene; cyclohexylstyrene; benzylstyrene; cyanostyrene; nitrostyrene; N,N-dimethylaminostyrene; acetoxystyrene; methyl 4-vinylbenzoate; phenoxystyrene; p-vinyl diphenyl sulfide; p-vinylphenyl phenyl oxide; acrylic and substituted acrylic monomers such as acrylic acid; methacrylic acid; methyl acrylate; 2-hydroxyethyl acrylate; 2-hydroxyethyl methacrylate; methyl methacrylate; cyclohexyl methacrylate; benzyl methacrylate; isopropyl methacrylate; octyl methacrylate; ethyl α-ethoxyacrylate; methyl α-acetoaminoacrylate; butyl acrylate; 2-ethylhexyl acrylate; phenyl acrylate, phenyl methacrylate; N,N-dimethylacrylate; N,N-dibenzylacrylamide; N-butylacrylamide; methacrylyl formamide; vinyl esters; vinyl ethers; vinyl ketones; vinyl acetate; vinyl alcohol; vinyl butyrate; isopropenylacetate; vinyl formate; vinyl acrylate; vinyl methacrylate; vinyl methoxy acetate; vinyl benzoate; vinyl toluene; vinyl naphthalene; vinyl methyl ether; vinyl ethyl ether; vinyl propyl ethers; vinyl butyl ethers; vinyl 2-ethylhexyl ether; vinyl phenyl ether; vinyl 2-methoxyethyl ether; methoxybutadiene; vinyl 2-butoxyethyl ether; 3,4-dihydro-1,2-pyran; 2-butoxy-2'-vinyl diethyl ether; vinyl 2-ethylmer-captoethyl ether; vinyl methyl ketone; vinyl ether ketone; vinyl phenyl ketone; vinyl ethyl sufide; vinyl ethyl sulfone; N-methyl-N-vinyl acetamide; N-vinylpyrrolidone; vinyl imidazole; divinyl sulfide; divinyl sulfoxide; divinyl sulfone; sodium vinyl sulfonate; methyl vinyl sulfonate; N-vinyl pyrrole; dimethyl fumaric; dimethyl maleate; maleic acid; crotonic acid; fumaric acid; itaconic acid; monomethyl itaconate; t-butylaminoethyl methacrylate; glycidyl acrylate; allyl alcohol; glycol monoesters of itaconic acid; vinyl pyridine; maleic anhydride; maleimide; N-substituted maleimides; such as N-phenylmaleimide and the like.

The polymerization initiator for the polymer polyol preparation may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN); dibenzoyl peroxide; lauroyl peroxide; di-t-butyl peroxide; diisopropyl peroxide carbonate; t-butyl peroxy-ω-ethylhexanoate; t-butylperpivalate; 2,5-dimethyl-hexane-2,5-di-per-2-ethyl hexoate; t-butylperneodecanoate; t-butylperbenzoate; t-butyl percrotonate; t-butyl perisobutyrate; di-t-butyl perphthalate; 2,2'-azo-bis(2-methylbutanenitrile) for example. Other suitable catalysts may be employed, of course. The concentration of initiator is not critical and can vary within wide limits of from about 0.1 to about 5.0 weight percent based on the total feed to the reactor. A chain transfer agent such as dodecylmercaptan may also be added.

The polyols most suitable for use in the polymer polyols of this invention (sometimes called the first polyoxyalkylene polyether polyol) are polyoxyalkylene polyether polyols or mixtures thereof which are the polymerization products of an alkylene oxide or a mixture of alkylene oxides with a polyhydric alcohol, as described above. The polyol may contain small amounts of unsaturation, but unsaturation is not intentionally added according to the invention. The molecular weight of the polyol will be within the range of from about 500 to about 15,000, preferably from about 2,000 to about 10,000. Although typically the polyols selected for the preparation of the intermediate, the esterification reaction and the polymer polyol will be identical, they may all be different polyoxyalkylene polyether polyols. As discussed above, depending on the weight percent anhydride polymer in the intermediate, a third addition of polyol may not be required.

Polymer polyols according to this invention will be formed by polymerizing from about 5 to less than about 50 weight percent, preferably 10 to 45 weight percent, of the ethylenically unsaturated monomer or monomer mixture, based on the total weight of the monomer and polyol, in from about 95 to about 50 or more weight percent, preferably about 90 to about 55 weight percent, of at least one polyoxyalkylene polyether polyol in the presence of a dispersant of the invention.

The intermediates, dispersants, and polymer polyols using the dispersants, and polyurethanes using the polymer polyols of the invention will be further illustrated with reference to the following examples, which are merely meant to exemplify and not define the invention.

EXAMPLE 1

Preparation of Dispersant by Reaction of Polyol with A Preformed Resin Containing Arthydride Groups Into a reactor fitted with a stirrer, condenser, and thermometer and under a blanket of nitrogen were charged 277.5 g. of polyol A and 22.5 g. of SMA 17352 resin. The contents were heated to 180° C., held at that temperature for 2 hours, and allowed to cool. The viscosity of the product was 9300 cps.

EXAMPLE 2

Example 1 was repeated with 285 g. of polyol B and 15 g. of SMA 17352 resin. The viscosity of the product was 15,000 cps.

EXAMPLE 3

Preparation of Dispersant by Reaction of Polyol with Polymaleic Anhydride

Example 1 was repeated with 96.5 g. of polyol D and 3.5 g of polymaleic anhydride resin (available from Polysciences Inc.). The viscosity of the product was 5,230 cps.

EXAMPLE 4

Preparation of Dispersant by Polymerizing Monomers in a Polyol Followed by Reaction of the Polyol with Anhydride Groups Into a reactor fitted with a stirrer, condenser, addition tube and thermometer and under a blanket of nitrogen were charged 200 g. of polyol D. After heating the reactor charge to 120° C., the feed charge was added over a 2 hour period at 120° C. Upon completion of the addition, the reaction product was held at temperature for 0.5 hours, then stripped of residual monomers for 1.5 hours at 115°–120° C. and <5 mm Hg. The contents were then heated to 180° C. for 2 hours under nitrogen and then allowed to cool. The viscosity of the product was 22,700 cps. The feed charge was as shown below, in grams:

| Methacrylic anhydride | 20 |
|---|---|
| Butyl acrylate | 80 |
| Vazo 67 ® initiator | 10 |
| Polyol D | 700 |

Examples 5 through 8, summarized in Table I, illustrate the preparation and properties of polymer polyols made using the dispersants from Examples 1 through 4. Procedures for Measurements of Physical Properties of Polymer Polyols Viscosity was measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

Preparation of Polymer Polyols

Into a reactor fitted with a stirrer, condenser, thermometer and addition tube and under a blanket of nitrogen were charged the amounts of reactants indicated in Table I. After heating the reactor charge to the reaction temperature, the feed charge was added over the indicated time period. Upon completion of the addition, the reaction product was held at the reaction temperature for 0.5 to 1.0 hours, then stripped of residual monomers for 1.0 hour at 115°–125° C. and <5 mm Hg.

TABLE I

| Preparation of Polymer Polyols | | | | |
|---|---|---|---|---|
| Example No. | 5 | 6 | 7 | 8 |
| Monomer charge, wt. % | 35 | 30 | 40 | 25 |
| S/AN Ratio | 75/25 | 75/25 | 75/25 | 70/30 |
| Base Polyol | C | A | C | C |
| Dispersant from Ex. | 1 | 2 | 4 | 3 |
| Reaction Temp., °C. | 120 | 120 | 120 | 120 |
| Feed addition time, hrs. | 2 | 2 | 2 | 2 |
| Feed, g. | | | | |
| Styrene | 525 | 450 | 600 | 350 |
| Acrylonitrile | 175 | 150 | 200 | 150 |
| Vazo 67 ® | 12 | 10 | 18 | 12 |
| Base polyol | 1131 | 1050 | 880 | 1050 |
| Reactor charge, g. | | | | |
| Base polyol | 117 | 280 | 284 | 390 |
| Dispersant | 52 | 70 | 36 | 60 |
| Properties | | | | |
| Viscosity, cps. 20/sec. | 2800 | 3580 | 5490 | 1810 |
| Particle Size, μ | 0.68 | 0.61 | 0.59 | 0.69 |
| Centrifugable solids, wt. % | 3.1 | 2.4 | 4.0 | 2.9 |

From the above data, it will be seen that the dispersants of this invention are effective in achieving stable dispersions at high solids contents. Moreover, the particle sizes, viscosities and centrifugable solids of the polymer polyols produced using the dispersants are excellent. It is anticipated further that polymer polyols employing the dispersants of the present invention will find utility as coreactants with polyisocyanates in the presence of a suitable polyurethane catalyst to produce polyurethane foams.

Preparation of Polyurethane Foams

Polyurethanes may be made by reacting the polymer polyols described above with an organic polyisocyanate in the presence of a polyurethane formation catalyst. If a foam is desired, a blowing agent such as a halocarbon (trichlorofluoromethane, for example), water, or carbon dioxide may also be present. The polyurethane formation catalysts are typically tin catalysts or tertiary amine compounds. Other conventional additives such as silicone surfactants, fire retardant additives (melamine, for example), etc. may also be present. For more information in preparing polyurethanes, particularly flexible polyurethanes, see U.S. Pat. Nos. 4,338,408; 4,342,687 and 4,381,353, incorporated by reference herein. The foams made using the polymer polyols described herein have excellent physical properties. Flexible carpet underlay foam and molded automobile foam may be prepared using the polymer polyols and techniques described herein.

A typical slab polyurethane foam is prepared by first charging polymer polyol, water, catalyst and silicone surfactant into a vessel while stirring vigorously. Next, the polyisocyanate is added to the vessel with stirring, and the resulting mixture is immediately poured into a cardboard cakebox; and the polyurethane foam is allowed to rise and cure at room temperature.

The polyurethane foams were separately prepared by charging the amounts of polymer polyol, water, catalysts and silicone surfactant indicated into a one-liter cylindrical container equipped with a mechanical stirrer. The mixture was stirred for about 10 seconds at about 2500 rpm and the indicated amount of polyisocyanate was introduced into the container with stirring for about 5 seconds. The contents of the container were then immediately poured into a cardboard cake box and the foam was allowed to rise. After the foam rise was completed, the foam was allowed to cure at room temperature for about one day.

EXAMPLE 9

Preparation of Polyurethane Foam

Using the procedure described above, the following carpet underlay formulation was used to prepare a polyurethane foam:

|  | pbw |
| --- | --- |
| Polymer polyol of Example 5 | 100 |
| Water | 2.2 |
| L-6202[1] | 0.8 |
| Amine[2] | 0.3 |
| T-10 Catalyst (50% active)[3] | 0.4 |
| TDI | 29.6 |

[1]Silicone surfactant, product of Union Carbide Corporation.
[2]Prepared from 2 parts B11 and 1 part 33LV, both of which are products of Air Products and Chemicals, Inc. and 3 parts Thanol ® F-3020, a product of ARCO Chemical Company.
[3]Organo tin catalyst, available from Air Products and Chemicals, Inc.

The foam reactivity was acceptable and the resulting foam showed the expected physical properties.

EXAMPLE 10

Preparation of Dispersant by Homopolymerizing an Anhydride Monomer in a Polyol, Followed by Reaction of the Polyol With Anhydride Groups Into a reactor fitted with a stirrer, condenser, addition tube, and under a blanket of nitrogen, were charged 200 g. of polyol A. After heating the reactor charge to 110° C., the feed charge was added over a 2 hour period at 120° C. Upon completion of the addition, the reaction product was held at temperature for 0.5 hours, then stripped of residual monomers for 1.5 hours at 120° C. and <5 mmHg.

The polymer content was 10 wt. %. Additional polyol A was added to adjust the polymer content to 3.8 wt. %, and the contents were then heated to 180° C. for 2 hours under nitrogen and then allowed to cool. The viscosity of the product was 8700 cps. The feed charge was as shown below in grams:

| Methacrylic Anhydride | 100 |
| --- | --- |
| Vazo ® 67 Initiator | 10 |
| Polyol A | 700 |

EXAMPLE 11

Preparation of Polymer Polyol

This Example demonstrates preparation of a polymer polyol using the dispersant of Example 10, in accordance with the claimed invention. The polymer polyol preparation is set forth in Table II:

TABLE II

| Preparation of Polymer Polyol | |
| --- | --- |
| Example No. | 11 |
| Monomer Charge, wt. % | 40 |
| S/AN Ratio | 75/25 |
| Base Polyol | C |
| Dispersant from Example | 10 |
| Reaction Temperature, °C. | 120 |
| Feed Addition Time, hrs. | 2 |
| Feed, g. | |
| Styrene | 600 |
| Acrylonitrile | 200 |
| Vazo 67 | 18 |
| Base Polyol | 880 |
| Reactor Charge, g. | |
| Base Polyol | 272 |
| Dispersant | 48 |
| Properties | |
| Viscosity, cps, 20/sec | 14,600 |
| Particle size, μ | 0.90 |
| Centrifugable Solids, wt. % | ND |

From Examples 10 and 11 it is seen that an anhydride monomer may be homopolymerized in situ in a polyol to make dispersant and that the dispersant may, in turn, may be used to make a polymer polyol in accordance with the claimed invention.

Many modifications may be made in the dispersants of this invention and their method of production without departing from the spirit and scope of the invention, which are defined only in the appended claims. For example, one skilled in the art could adjust the temperature, pressure, reactants, proportions and modes of addition within the parameters set forth to provide dispersants with particularly advantageous properties. Monomers and combinations of monomers other than those explicitly recited are anticipated as useful herein.

| GLOSSARY | |
| --- | --- |
| Polyol A | (ARCOL ® 1342 polyol) A glycerin started polyether of propylene oxide and ethylene oxide containing 14 wt. % ethylene oxide having a hydroxyl number of 34 and a primary hydroxyl group content of 80% of the total hydroxyl content made by ARCO Chemical Co. |
| Polyol B | A glycerin started polyether of propylene oxide and ethylene oxide containing 15 wt. % ethylene oxide with a hydroxyl number of 16 and a primary hydroxyl group content of 80% of the total hydroxyl content. |
| Polyol C | (ARCOL ® 1131 polyol) A glycerin started polyether of porpylene oxide and ethylene oxide containing 12% random ethylene oxide have a hydroxyl number of 48 made by ARCO Chemical Co. |
| Polyol D | A partially started polyether of propylene oxide and ethylene oxide containing 14 wt. % ethylene oxide with a hydroxyl group content of 80% of the total hydroxyl content. |
| SMA 17352 polymer | A partially esterified styrene maleic anhydride copolymer resin, sold by the Sartomer division of Atochem. |
| Vazo ® 67 | 2,2'-Azobis(2-methylbutanenitrile) polymerization catalyst made by E. I. duPont de Nemours and Co. |

We claim:
1. A stable polymer polyol composition comprising a continuous phase, a disperse phase within the continu- ous phase, and a dispersant for enhancing the stability of the polymer polyol, wherein
  (a) the disperse phase consists essentially of vinyl polymer particles;
  (b) the continuous phase consists essentially of a first polyoxyalkylene polyether polyol; and
  (c) a dispersant produced by the process comprising:
    (1) polymerizing, in the presence of a free radical initiator, from about 1 to about 50 weight percent of at least one anhydride monomer selected from the group consisting of $C_1$-$C_{20}$ anhydride monomers having a formula selected from the group consisting of:

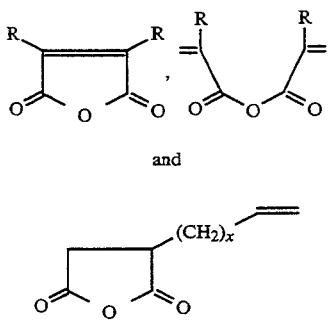

and

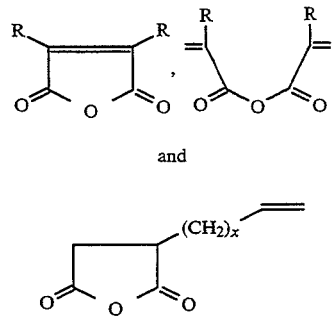

where each R group is independently H, lower alkyl or phenyl and x is an integer from 0 to 6; in from about 99 to about 50 weight percent of a second polyoxyalkylene polyether polyol to form a single phase homogeneous liquid intermediate reaction product and
    (2) esterifying from about 1 to about 100 mole percent of the total anhydride groups in the intermediate reaction product with the hydroxyl groups of the second polyoxyalkylene polyether polyol to form the dispersant, carboxylic acid groups being produced thereby;
  where the polymerizing and esterifying are conducted (i) simultaneously in situ or (ii) sequentially with esterifying following polymerizing;
said dispersant being employed in an effective amount to stabilize the resulting polymer polyol.

2. The polymer polyol composition of claim 1 where the anhydride monomer is selected from the group consisting of maleic anhydride; crotonic anhydride; iraconic anhydride; citraconic anhydride; 2,3-dimethyl maleic anhydride; acrylic anhydride; methacrylic anhydride; propyl succinic anhydride; derivatives thereof; and mixtures thereof.

3. The polymer polyol composition of claim 1 where the anhydride monomer is co-polymerized with at least one other ethylenically unsaturated comonomer.

4. The polymer polyol composition of claim 3 where the comonomer is styrene.

5. The polymer polyol composition of claim 1 in which said dispersant (c) is formed by polymerizing from about 20 to about 50 weight percent of the at least one anhydride monomer in from about 80 to about 50 weight percent of the polyol.

6. The polymer polyol composition of claim 1 in which said dispersant (c) is employed in an amount within the range of from about 0.1 to about 30 weight percent based on the total weight of (a)+(b)+(c).

7. The polymer polyol composition of claim 1 in which said dispersant (c) is employed in an amount within the range of from about 1 to about 15 weight percent based on the total weight of (a)+(b)+(c).

8. The polymer polyol composition of claim 1 in which the weight ratio of the disperse phase (a) to the continuous phase (b) is within the range of from about 1:19 to about 1:1.

9. The polymer polyol composition of claim 1 in which said first and second polyoxyalkylene polyether polyols have the same composition.

10. The polymer polyol composition of claim 1 in which said first and second polyoxyalkylene polyether polyols have different compositions.

11. The polymer polyol composition of claim 1 in which an additional second polyoxyalkylene polyether polyol or a third polyoxyalkylene polyol is added to dilute the anhydride just prior to esterifying.

12. A stable polymer polyol composition comprising a continuous phase, a disperse phase within the continuous phase, and a dispersant for enhancing the stability of the polymer polyol, wherein
  (a) the disperse phase consists essentially of vinyl polymer particles;
  (b) the continuous phase consists essentially of a first polyoxyalkylene polyether polyol; and
  (c) a dispersant produced by the process comprising:
    (1) polymerizing, in the presence of a free radical initiator, from about 1 to about 50 weight percent of at least one anhydride monomer selected from the group consisting of homopolymers and copolymers of $C_1$-$C_{20}$ anhydride monomers having a formula selected from the group consisting of:

and where each R group is independently H, lower alkyl or phenyl and x is an integer from 0 to 6, in from about 99 to about 50 weight percent of a second polyoxyalkylene polyether polyol to form a single phase homogeneous liquid intermediate reaction product and
    (2) esterifying from about 1 to about 100 mole percent of the total anhydride groups in the intermediate reaction product with the hydroxyl groups of the second polyoxyalkylene polyether polyol to form the dispersant, carboxylic acid groups being produced thereby;
  where the polymerizing and esterifying are conducted (i) simultaneously in situ or (ii) sequentially with esterifying following polymerizing;
said dispersant being employed in an effective amount to stabilize the resulting polymer polyol, and where the first and second polyoxyalkylene polyether polyols have a number average molecular weight within the range of from about 500 to about 15,000.

13. The polymer polyol composition of claim 12 where the anhydride monomer is selected from the group consisting of maleic anhydride; crotonic anhydride; itaconic anhydride; citraconic anhydride; 2,3-dimethyl maleic anhydride; acrylic anhydride; methacrylic anhydride; propyl succinic anhydride; derivatives thereof; and mixtures thereof.

14. The polymer polyol composition of claim 12 where the anhydride monomer is co-polymerized with at least one other ethylenically unsaturated comonomer.

15. The polymer polyol composition of claim 14 where the comonomer is styrene.

16. The polymer polyol composition of claim 12 in which said dispersant (c) is formed by polymerizing from about 20 to about 50 weight percent of the at least one anhydride monomer in from about 80 to about 50 weight percent of the polyol.

17. The polymer polyol composition of claim 12 in which said dispersant (c) is employed in an amount within the range of from about 0.1 to about 30 weight percent based on the total weight of (a)+(b)+(c).

18. The polymer polyol composition of claim 12 in which the weight ratio of the disperse phase (a) to the continuous phase (b) is within the range of from about 1:19 to about 1:1.

19. The polymer polyol composition of claim 12 in which an additional second polyoxyalkylene polyether polyol or a third polyoxyalkylene polyol is added to dilute the anhydride just prior to esterifying.

20. The polymer polyol composition of claim 12 in which said disperse phase is polystyrene particles.

21. The polymer polyol composition of claim 12 in which said disperse phase is styrene/acrylonitrile copolymer particles.

22. The polymer polyol composition of claim 12 in which said disperse phase is styrene/N-phenylmaleimide copolymer particles.

23. The polymer polyol composition of claim 12 in which said disperse phase is styrene/N-phenylmaleimide/acrylonitrile copolymer particles.

24. The polymer polyol composition of claim 12 in which said continuous phase is a polyoxyalkylene polyether polyol having a molecular weight within the range of from about 2,000 to about 10,000.

25. A method of stabilizing a polymer polyol comprising vinyl polymer particles dispersed in a continuous polyether polyol phase against phase separation, the method comprising incorporating into the polymer polyol composition a dispersant formed by polymerizing, in the presence of a free radical initiator, from about 1 to about 50 weight percent of at least one anhydride monomer selected from the group consisting of $C_1$-$C_{20}$ anhydride monomers having a formula selected from the group consisting of:

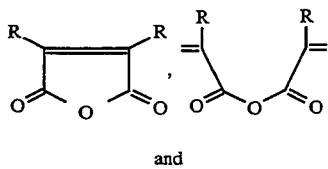

and

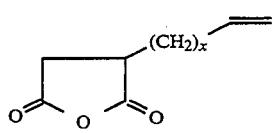

where each R group is independently H, lower alkyl or phenyl and x is an integer from 0 to 6; in from about 99 to about 50 weight percent of a polyoxyalkylene polyether polyol to form a single phase homogeneous liquid intermediate reaction product and esterifying from about 1 to about 100 mole percent of the total anhydride groups in the intermediate reaction product with the hydroxyl groups of the polyoxyalkylene polyether polyol to form the dispersant, carboxylic acid groups being produced thereby;

where the polymerizing and esterifying are conducted (i) simultaneously in situ or (ii) sequentially with esterifying following polymerizing.

26. A dispersant produced by the process comprising:
polymerizing, in the presence of a free radical initiator, at least one anhydride monomer selected from the group consisting of $C_1$-$C_{20}$ anhydride monomers having a formula selected from the group consisting of:

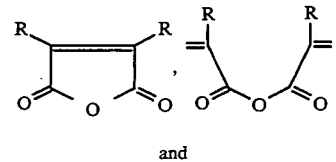

and

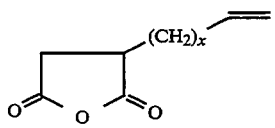

where each R group is independently H, lower alkyl or phenyl and x is an integer from 0 to 6; to form a polymer and esterifying from about 1 to about 100 mole percent of the total anhydride groups in the polymer with hydroxyl groups of a polyoxyalkylene polyether polyol to form the dispersant, carboxylic acid groups being produced thereby;

where the polymerizing and esterifying are conducted (i) simultaneously in situ or (ii) sequentially with esterifying following polymerizing.

27. The dispersant of claim 26 where the polymerization of the anhydride monomer occurs prior to mixing the polymer with the polyoxyalkylene polyether polyol and subsequent esterification therewith.

28. The dispersant of claim 26 where the anhydride monomer is mixed with the polyoxyalkylene polyether polyol and is polymerized in situ with the polyoxyalkylene polyether polyol prior to esterification with the polyoxyalkylene polyether polyol.

29. The dispersant of claim 26 where the anhydride monomer is selected from the group consisting of maleic anhydride; crotonic anhydride; itaconic anhydride; citraconic anhydride; 2,3-dimethyl maleic anhydride; acrylic anhydride; methacrylic anhydride; propyl succinic anhydride; derivatives thereof; and mixtures thereof.

30. The dispersant of claim 26 where the polyoxyalkylene polyether polyol has a molecular weight within the range of from about 500 to about 15,000.

31. The dispersant of claim 26 where the anhydride monomer is copolymerized with at least one other ethylenically unsaturated comonomer.

32. The dispersant of claim 31 where the comonomer is styrene.

33. A dispersant produced by the process comprising:
polymerizing, in the presence of a free radical initiator, from about 1 to about 50 weight percent of at least one anhydride monomer selected from the group consisting of $C_1$-$C_{20}$ anhydride monomers having a formula selected from the group consisting of:

and

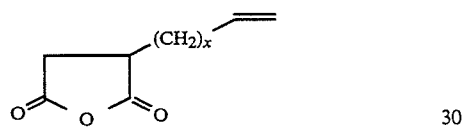

where each R group is independently H, lower alkyl or phenyl and x is an integer from 0 to 6; in from about 99 to about 50 weight percent of a polyoxyalkylene polyether polyol to form a single phase homogeneous liquid intermediate reaction product and
esterifying from about 1 to about 100 mole percent of the total anhydride groups in the intermediate reaction product with the hydroxyl groups of the polyoxyalkylene polyether polyol to form the dispersant, carboxylic acid groups being produced thereby;
where the polymerizing and esterifying are conducted (i) simultaneously in situ or (ii) sequentially with esterifying following polymerizing.

34. The dispersant of claim 33 where the anhydride monomer is selected from the group consisting of maleic anhydride; crotonic anhydride; itaconic anhydride; citraconic anhydride; 2,3-dimethyl maleic anhydride; acrylic anhydride; methacrylic anhydride; propyl succinic anhydride; derivatives thereof; and mixtures thereof.

35. The dispersant of claim 33 where the polyoxyalkylene polyether polyol has a molecular weight within the range of from about 500 to about 15,000.

36. The dispersant of claim 33 where the anhydride monomer is copolymerized with at least one other ethylenically unsaturated comonomer.

37. The dispersant of claim 36 where the comonomer is styrene.

38. A method of making a stable polymer polyol composition comprising the steps of:
(a) preparing a dispersant comprising the steps of:
(1) polymerizing, in the presence of a free radical initiator, from about 1 to about 50 weight percent of at least one anhydride monomer selected from the group consisting of $C_1$-$C_{20}$ anhydride monomers having a formula selected from the group consisting of:

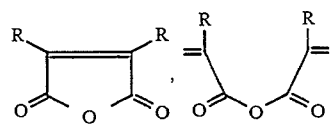

and

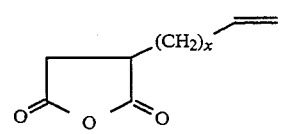

where each R group is independently H, lower alkyl or phenyl and x is an integer from 0 to 6; in from about 99 to about 50 weight percent of a second polyoxyalkylene polyether polyol to form a single phase homogeneous liquid intermediate reaction product and
(2) esterifying from about 1 to about 100 mole percent of the total anhydride groups in the intermediate reaction product with the hydroxyl groups of the second polyoxyalkylene polyether polyol to form the dispersant where the polymerizing and esterifying are conducted (i) simultaneously in situ or (ii) sequentially with esterifying following polymerizing;
(b) polymerizing vinyl polymer particles in a first polyoxyalkylene polyether polyol containing an effective amount of said dispersant to stabilize the resulting polymer polyol.

39. A method of making a dispersant comprising the steps of:
polymerizing, in the presence of a free radical initiator, at least one anhydride monomer selected from the group consisting of $C_1$-$C_{20}$ anhydride monomers having a formula selected from the group consisting of:

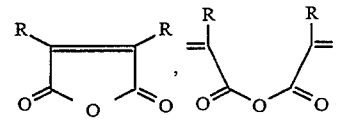

and

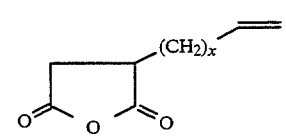

where each R group is independently H, lower alkyl or phenyl and x is an integer from 0 to 6; to form a polymer and
esterifying from about 1 to about 100 mole percent of the total anhydride groups in the polymer with hydroxyl groups of a polyoxyalkylene polyether polyol to form the dispersant;
where the polymerizing and esterifying are conducted (i) simultaneously in situ or (ii) sequentially with esterifying following polymerizing.

* * * * *